Oct. 15, 1946. A. S. KROTZ 2,409,500
SPRING
Filed Feb. 3, 1943 3 Sheets-Sheet 1
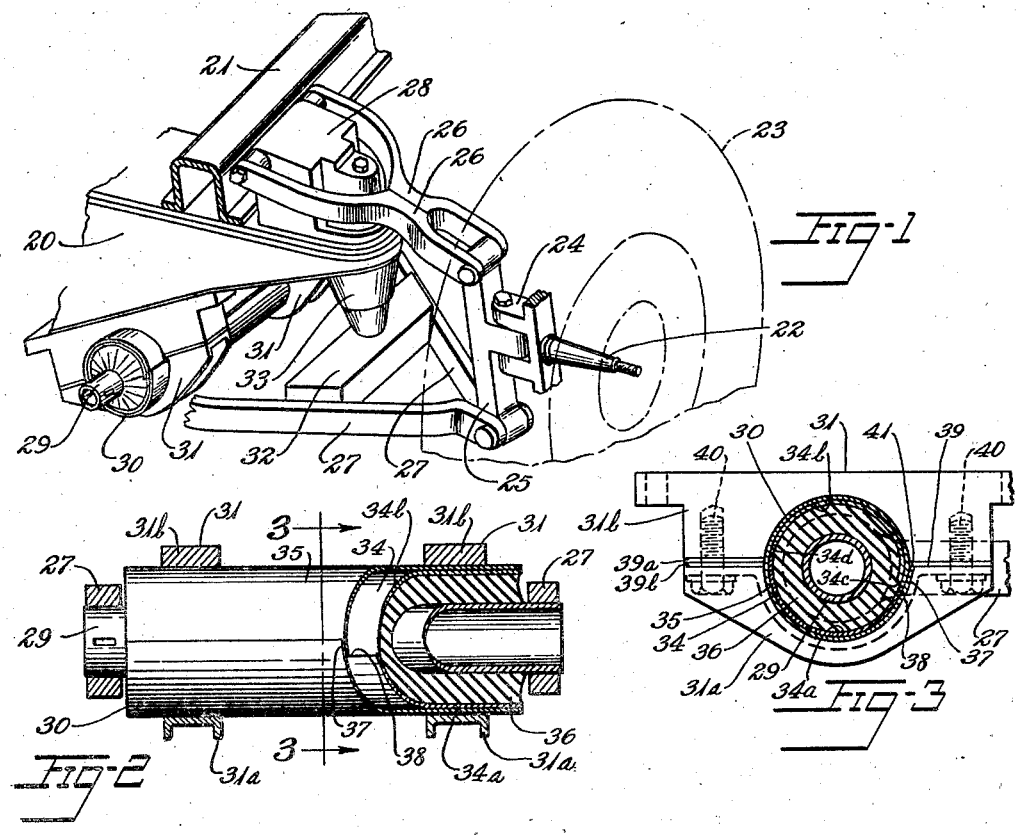
Inventor
Alvin S. Krotz
By Willis F. Avery
Atty.

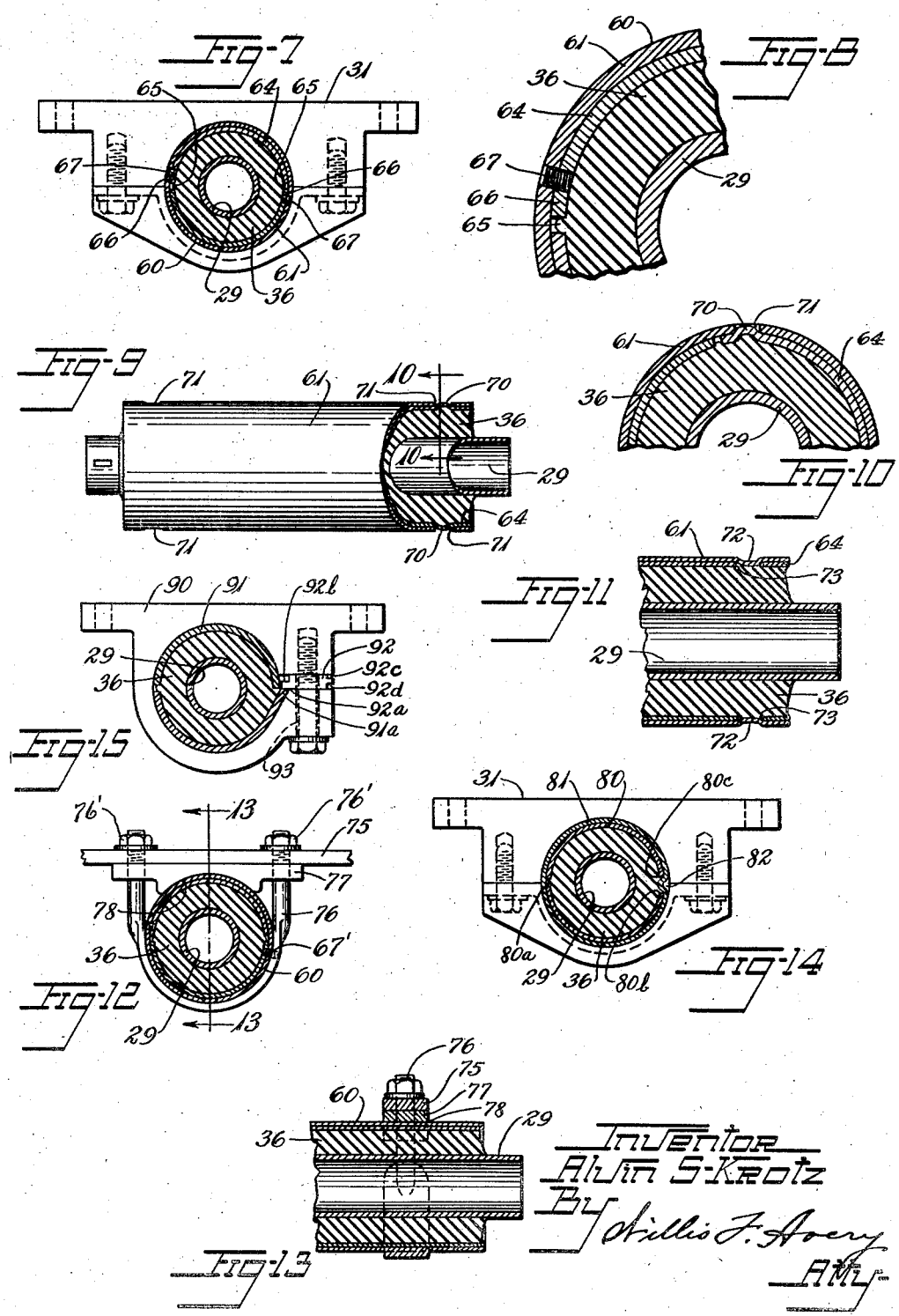

Patented Oct. 15, 1946

2,409,500

UNITED STATES PATENT OFFICE 2,409,500

SPRING

Alvin S. Krotz, Akron, Ohio, assignor to The B. F. Goodrich Company, New York, N. Y., a corporation of New York Application February 3, 1943, Serial No. 474,545

8 Claims. (Cl. 267—21)

This invention relates to springs and especially to torsion springs of the type having an inner shaft member, a circumferentially discontinuous outer sleeve structure and an intervening body of resilient rubber or other rubber-like material between the inner and outer members adapted to be stressed torsionally upon relative rotational movement of the inner shaft member and outer sleeve structure.

A chief object of the invention is to provide for effectively locking the torsion spring against objectionable movement with respect to its mounting, and especially to lock the same against rotational slippage. Further objects are to provide for increasing the strength of the locking action against rotation by a self-energizing action and to provide the locking while maintaining a maximum working thickness of the springing medium. Additional objects are to provide for simplicity of construction, economy of materials, and convenience of manufacture and assembly.

These and further objects will be apparent from the following description, reference being had to the accompanying drawings in which:

Fig. 1 is a perspective view of a portion of vehicle suspension incorporating a torsion spring constructed in accordance with and embodying the invention.

Fig. 2 is a side elevation on an enlarged scale of the torsion spring of Fig. 1, parts being broken away and sectioned, and associated structure being shown in section.

Fig. 3 is a section taken along the line 3—3 of Fig. 2.

Fig. 4 is a view like Fig. 3, but of a modified construction.

Fig. 5 is a view like Fig. 3, but of a further modified construction.

Fig. 6 is a cross-section of the spring of Fig. 5, before mounting.

Fig. 7 is a view like Fig. 3, but of a still further modified construction.

Fig. 8 is a fragmentary cross-sectional view on an enlarged scale of the construction of Fig. 7.

Fig. 9 is an elevation of another modification, parts being broken away and sectioned.

Fig. 10 is a section on an enlarged scale, taken along the line 10—10 of Fig. 9.

Fig. 11 is a fragmentary side elevation of another modification.

Fig. 12 is a view like Fig. 3, but of another modification.

Fig. 13 is a section taken along the line 13—13 of Fig. 12, parts being broken away.

Fig. 14 is a view like Fig. 3, but of another modified construction.

Fig. 15 is a view like Fig. 3, but of another modification.

Figure 16:
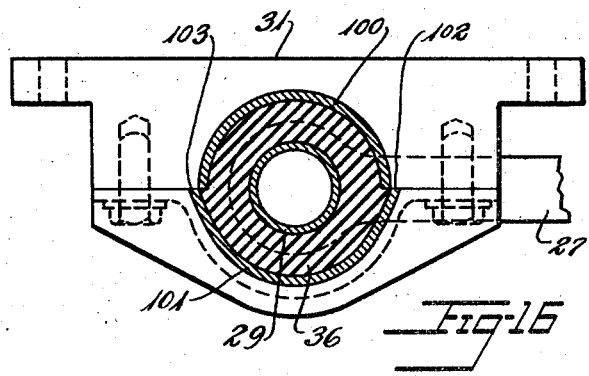
Figs. 16 and 17 are views like Fig. 3 but showing further modifications.

Features of the invention are useful in springs generally, but the invention is especially useful in its application to wheel suspensions of vehicles. In the drawings various of the embodiments of the invention are shown as applied to the independent vehicle wheel suspension of Fig. 1, by way of example, which suspension comprises a cross member 20 mounted on a longitudinal frame or body member 21 and linked to a spindle 22 which supports a wheel 23. The spindle 22 is supported by a king-pin member 24 which is pivotally connected to an upright member 25. Upper link arms 26, 26 and lower link arms 27, 27 for connecting the frame member 20 and the wheel 23 are pivotally connected at the upper and lower ends of member 25, while the arms 26, 26 are pivotally connected at their other ends to a mounting member 28 on the frame member 20, and arms 27, 27 are suitably attached to a shaft 29 of a torsion spring or bushing 30, the bushing 30 being mounted on the frame member 20 by means of bracket members 31, 31.

The pivotal connections of the link arms 26, 26 and 27, 27 at the bracket member 25 and at the mounting member 28 may comprise bodies of rubber-like material between metal parts or these may be simple pivotal joints or anti-friction bearings as desired.

A stop-member 32 may be mounted on the arms 27, 27 to permit bottoming of a resilient member 33 mounted on the frame member 20 to cushion extreme deflections of the suspension.

The torsion bushing 30 provides springing of the vehicle by resiliently resisting relative vertical movement between the body and the wheels of the vehicle through torsional stress on the resilient rubber or other rubber-like material of the bushing.

One form of generally cylindrical torsion bushing 30 is shown in the illustrative embodiment of Figs. 1, 2 and 3 of the drawings, in which the bushing comprises the inner shaft member 29, a pair of outer annular shell or sleeve members 34 and 35, and a body 36 of resilient rubber or other rubber-like material between the shaft 29 and the shell member 34. Preferably the body 36 is bonded by vulcanization to the shaft 29 and the inner sleeve structure 34.

The outermost housing shell 35 may be in one piece and axially split on one side while the innermost shell 34 may be axially split on two sides to provide two sleeve parts 34a, 34b, the splits being shown at 34c, 34d. The margins of the outermost shell 35, formed by the split side, overlap, as shown at 37. The innermost shell 34 is disposed with its leading margin (in the counter-clockwise direction) in abutment with the inner or trailing margin of the overlapping pair of edges of the outermost shell, as indicated at 38, while the other or trailing margin of the innermost shell, indicated at 34c, terminates inwardly of and preferably short of the contacting margins at 38. The margins at the other side of the innermost shell 34 preferably terminate at circumferentially spaced-apart positions to facilitate mounting of the rubber-like material of the bushing under radial compression in the shell 35 and supporting bracket members 31, 31. Some initial radial compression is desirable for increasing life of the rubber-like material under the stresses encountered in use, and for facilitating a self-effecting anchoring or binding action hereinafter described. In some cases the split at 34d may be omitted in the inner shell 34, with good results, the discontinuity of the shell being supplied by the other split at 34c.

The bracket members 31, 31 which are mounted on the frame member 20 for holding the bushing 30 preferably comprise an outer portion 31a and an inner portion 31b and a spacing member 39 between the portions 31a and 31b, the portions being fastened together as by means of bolts 40, 40.

The bushing 30 is mounted in the bracket mounting means 31 in a manner such that the outer axial margin of the overlapping edges of the outermost shell 35 abuts the spacing member 39 between the two sections 31a and 31b of the bracket holding means 31, as shown at 41 in Fig. 3, so that any tendeny for relative movement of the shell 35 with respect to the bracket 31, counter-clockwise in Fig. 3, under the weight of the vehicle will be resisted by this abutment of the spacing member 39 with the outermost or leading margin of the outermost shell 35.

Thus a self-energizing effect is provided for in the bushing structure by forces in the bushing producing a tendency for radially outward movement or unwrapping of the outer shell 35 against the bracket holding means 31, and of the part 34a of the inner shell against the outer shell 35, under the torsional stresses set-up in the rubber-like material of the bushing as the load rotates the shaft 29 in the counterclockwise direction in Fig. 3.

The lower section 31a of the bracket holding means 31 for the bushing 30 is preferably constructed to accommodate, by an inset construction of the section 31a the locking edge of the outermost shell 35, thereby avoiding undue localized reduction of thickness of the rubber-like material 36.

The thickness of the spacing member 39 may be varied to suit the desired amount of initial wind-up of the spring under static load which affects the normal level of the body with respect to the wheel, as for example, by varying the thickness of the spacer or by the use of more than one spacer, or by changing about the spacing members shown at 39, 39a and 39b in Fig. 3.

In the modification of Fig. 4 the outer overlapping edge 42 of the outermost shell 43 is held against counter-clockwise rotation by a shoulder formed in the upper section 44 of the bracket indicated generally at 31, of which the lower section is indicated at 45, and a projecting portion, which may be supplied by a bent out shoulder 46 at the other side of the bushing is accommodated by a set back edge of the upper bracket member 44 and held against a corner of the lower bracket member 45, as shown, thus providing a double engagement of the outer shell 43 against counter-clockwise rotation. The leading margins at the splits of the two sections 47, 48 of the inner shell project radially outward from the adjacent trailing margins of the sections so as to engage the edge 49 and shoulder 46, respectively, of the outer shell to prevent counter-clockwise rotation of the bushing under load and permit the added self-energizing action of the trailing portions of both the sections 47, 48 to assist in holding the spring against the rotation so that the shoulder engagements alone need not support all the load.

In the embodiment of Figs. 5 and 6, the bushing comprises a one-piece outer shell 50 split on one side and mounted tightly in a divided bracket indicated generally at 31. The shell 50 is formed with an edge 52 disposed radially outward prior to assembly, as indicated in Fig. 6, so that when mounted tightly in the bracket the projecting edge 52 will bear against the bushing-receiving surface of the bracket or holding means in a manner to resist relative counter-clockwise rotational movement of the bushing with respect to such holding means by a biting engagement of the edge, and to provide the self-energizing action or tendency for unwrapping of the shell against the holding means and distribute the holding stresses about the shell by increase of friction, so that the edge 52 need not sustain all the holding load as the resilient body 36 is twisted by counter-clockwise rotation of the shaft 29. A substantially tangential disposition of the margin at the edge 52 has been found suitable. If desired, the surface of the bracket 31 may be suitably roughened or ridged to facilitate the engagement of the edge 52 against it.

In the embodiment of Figs. 7 and 8 a torsion bushing assembly 60 is shown mounted in the bracket holding means indicated generally at 31, and comprises a circumferentially continuous outer housing or shell 61 secured to the holding means 31 in any suitable manner as by a tight clamping of it, an inner shaft member 29, a body 36 of resilient rubber-like material, and a circumferentially discontinuous shell member 64 between the rubber-like material 36 and housing 61. The inner shell 64 is axially split on two sides to form two sections, the edges between the two sections being spaced-apart thereby forming spaces 65, 65 to facilitate mounting of the bushing 60 in the housing 61 under initial radial compression of the rubber-like material 36.

The sections of the split shell 64 are suitably fastened to the outer housing 61 as by means of set screws 67, 67 close to the leading edges 66, 66 of the sections of the split shell 64 in the direction of the tendency for relative rotation of the bushing 60 with respect to the holding means 31 (counter-clockwise in the drawings). Thus the desired self-energizing or unwrapping action of the unattached portions of the sections of the split shell 64 trailing the points of attachment is provided, resulting in an increase of frictional holding of the surface of contact of the sections of the shell 64 and the housing shell 61. This attachment of the shell sections 64 to the outer shell 61 has the advantage of additional security against slippage of the bushing axially as well as circumferentially.

Alternatively, the sections of the split shell 64 and the housing 61 may be secured at the desired points of attachment by means of raised portions provided on the shell and adapted to be held in holes or recesses in the housing 61, as for example, by raised portions 70, 70 and corresponding holes 71, 71 shown in the embodiment of Figs. 9 and 10, thereby providing a simplified and economical, yet effective, structure in which resistance is provided to the tendency for longitudinal or axial movement in addition to the resistance to rotation. Or, if desired, a raised portion 72 may be provided in the outer housing member 61 adapted to fit a corresponding hole 73 provided in the split shell 64, as shown in the embodiment of Fig. 11, for like purposes.

In the form of Figs. 12 and 13 the bushing 60 is mounted on a frame member 75 by means of an attaching arrangement comprising U-bolt 76 and a plate member 77 having an arcuate surface 78 for extensive frictional contact with the bushing 60 to hold it against relative sliding movement or assist in the holding action, the construction and operation being otherwise like that of the embodiment of Figs. 7 and 8. However, by extending the set screw 67' through the strap 76, as shown at 67' in Fig. 12, further anchorage is provided in a manner such that by adjustment of the nuts 76', 76' and corresponding adjustment of the strap, rotative adjustment of the bushing may be thus effected.

In the embodiment of Fig. 14 provision is made for obtaining the self-energizing action, hereinabove described, whether the spring be twisted in the clockwise or the counter-clockwise direction, this action being effective in both such directions. The spring comprises a shell 80 which may be split at 80a although this split may be omitted if desired. At the opposite side the shell 80 is split to provide opposing leading edges 80b, 80c. The body of resilient rubber-like material 36 is preferably bonded by vulcanization to the shell 80 and the inner shaft 29. The spring is retained by an outer circumferentially continuous shell 81 held within the bracket 31 by tight clamping or in any other suitable manner.

For resisting rotation of the inner shell of the spring bushing with relation to the outer shell 81, an inward crease 82 in the outer shell provides a pair of shoulders adapted to engage the edges 80b and 80c of the inner shell 80. Under a twisting load on the spring applied to the shaft 29 in the counter-clockwise direction in Fig. 14, the edge 80b is restrained from movement by the lower shoulder of the crease 82 and the portion of the shell 80 which trails the edge 80b increases the force of its frictional engagement with the outer shell by the tendency of such trailing portion to unwrap, in the manner hereinbefore described, this action taking place whether the shell is in one piece or is split as at 80a into sections. Upon application of the load in the opposite or clockwise direction the edge 80c engages the upper shoulder of the crease 82 and an increase in the binding action of the portion of the shell 80 which trails the edge 80c takes place by its tendency to unwrap in the clockwise direction against the outer shell 81.

In the embodiment of Fig. 15 a modified form of mounting means comprises a one-piece bracket member 90, shown for example with a single split shell bushing 91 mounted therein. The bracket member 90 is split along one side to accommodate a spacer member 92 presenting a variety of surfaces 92a, 92b, 92c and 92d in different planes which may be positioned as desired to receive a substantially tangential margin of an edge of a section 91a of the split shell of the bushing 91 at various circumferential stations in abutting contact to resist relative rotation of the bushing 91 in the bracket member 90 and to provide means for adjusting the normal level of the supported body. The spacer member 92 may be readily removable for adjustment by means of a bolt 93 in the bracket as shown or by any other suitable detachable fastening means.

The embodiment of Fig. 16 provides for obtaining the benefit of the self-energizing action under springing movements in which the spring is stressed in either of the two rotative directions. In this figure the body 36 of resilient rubber-like material is mounted between and preferably bonded by vulcanization to the inner shaft element 29, and a pair of outer sleeve elements 100 and 101, the whole being held within a two-part mounting bracket 31. The lower half section 101 of the outer sleeve is formed with both its margins 102 and 103 protruding substantially in tangential directions from the adjacent surfaces of the spring so as to provide leading edges for anchorage against both directions of rotation. The anchorage is effected by engagement of these leading edges against the upper bracket section, the lower bracket section being suitably inset to accommodate this, as shown. Upon upward swinging movement of the arm 27, which is secured to the shaft 29, the spring is stressed in the counter-clockwise direction as seen in Fig. 16. The leading edge 102 of the lower sleeve section 101 is anchored against such rotation by engagement with the upper bracket section, while the portion of the sleeve section 101 trailing such leading edge 102 is effective to increase its pressure against the bracket by its tendency to unwrap. In operation under the reverse, or clockwise, direction of rotation, obtained by a downward swinging of the arm 27, the edge 103 of the lower sleeve section 101 becomes leading and by its engagement with the upper bracket section is anchored against rotation so that the portion of the sleeve section 101 trailing the edge 103 is effective to increase its holding pressure against the bracket by a similar action.

Figure 17:
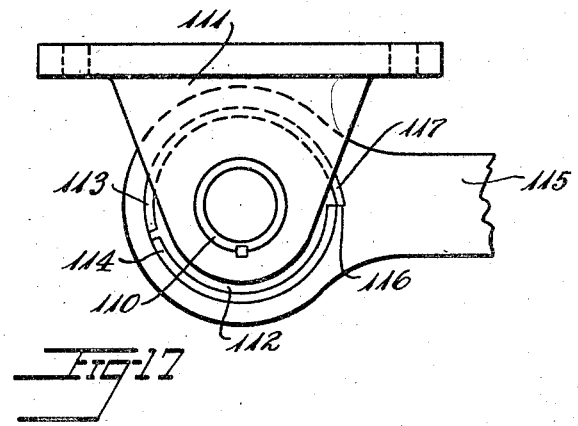

While the embodiments hereinabove described illustrate application of the invention to cases wherein the swinging arm is secured to the inner shaft and the outer sleeve is secured to a frame structure, it will be understood that the benefits of these embodiments are applicable as well to cases where the conditions are reversed, that is the swinging arm is secured to the outer sleeve by the spring and the inner shaft element is secured to the frame. For example, as is shown in the embodiment of Fig. 17, an inner shaft 110 of a spring is mounted and keyed in a supporting bracket structure 111. A body of rubber-like material 112 is mounted between the shaft and an outer sleeve, which may be doubly split to provide upper and lower sleeve sections 113, 114, the body 12 being preferably secured both to the shaft and to the sleeve by vulcanization. A swinging arm 115 is suitably apertured to receive the spring with the sleeve sections 113, 114 in engagement with it. For obtaining the self-energizing action to augment the anchorage under stress of the spring in the counter-clockwise direction, the arm 115 is shouldered at 116 and the edge 117 of the sleeve section 113 protrudes radially outward to engage shoulder 116. In operation under counter-clockwise stress of the spring the portion of the sleeve section 113 trailing the anchored edge 117 increases its holding pressure against the arm by a tendency to unwrap under such stress.

Variations may be made without departing from the scope of the invention as it is defined by the following claims.

I claim:

1. A torsion spring comprising inner and outer torque elements and an intervening cylindrical body of resilient rubber-like material bonded to said elements, the outer element comprising a divided sleeve having adjacent edges extending longitudinally of the sleeve, one of the margins being obliquely inclined outwardly and its edge being disposed radially outward of the adjacent edge in the condition of the spring prior to assembly in a support.

2. A torsion spring assembly comprising a support and a torsion spring mounted in said support, said torsion spring comprising inner and outer elements and a body of resilient material between said elements, and said outer element comprising a circumferentially discontinuous sleeve having a leading portion projecting outwardly beyond an adjacent surface portion in the unmounted condition of said assembly and anchored against movement in a direction of rotation with relation to said support and a trailing portion unanchored to said support for developing increased holding pressure against said support under torque of the spring in said direction, said outer element being free of attachment to said support between said leading portion and said trailing portion.

3. A torsion spring assembly as defined by claim 2 in which said support comprises shoulder means for engaging said leading portion of said sleeve in abutting relation thereto and said leading portion of the sleeve comprises an edge disposed radially outward of the adjacent outer surface of the spring in the assembled condition thereof for anchorage by engagement of said edge with said shoulder means.

4. A torsion spring assembly as defined by claim 2 in which said sleeve structure comprises a plurality of sections in series circumferentially of the spring, at least one of said sections having an outwardly projecting leading portion anchored as defined.

5. A torsion spring assembly as defined by claim 2 in which said support comprises clamping portions for receiving said torsion spring, and removable means is provided between said portions for engaging said leading portion of said sleeve in abutting relation thereto.

6. A torsion spring assembly as defined by claim 2 in which said support comprises clamping portions for receiving said torsion spring and a shim between said clamping portions for engaging said leading portion of said sleeve in abutting relation thereto, said shim comprising off-set faces for engaging said leading portion at rotatably adjustable positions of said sleeve.

7. A torsion bushing assembly comprising a support formed with an opening having an axial shoulder and a torsion spring mounted in the opening, said torsion spring comprising inner and outer elements spaced-apart from each other and an intervening body of resilient rubber-like material in torque-transmitting relation to said elements, said body comprising the sole torque-transmitting means between said elements, said outer element comprising sheet metal bonded to the outer surface of said intervening body with an axially extending margin thereof continuing radially beyond an adjacent curved portion and abutting said axial shoulder, the remainder of said outer element being free of attachment to said support and being adapted to engage said support frictionally by increasing pressure when subjected to torsion by virtue of the engagement of its axial margin against the shoulder.

8. A torsion bushing assembly comprising a support formed with an opening having an axial shoulder and a torsion spring mounted in the opening, said torsion spring comprising inner and outer elements and an intervening body of resilient rubber-like material in torque-transmitting relation to said elements, said outer element comprising complementary members of sheet metal extending about and bonded to the outer surface of said intervening body with an axial margin of one member projecting radially beyond the adjacent margin of a complementary member and abutting said axial shoulder, the remaining portion of said first-named member being free of attachment to said support and being adapted to engage said support frictionally by increasing pressure when subjected to torsion by virtue of the engagement of the axial margin with said shoulder.

ALVIN S. KROTZ.